United States Patent
Hayashi

(10) Patent No.: US 10,590,894 B2
(45) Date of Patent: Mar. 17, 2020

(54) SUCTION FILTER AND FUEL SUPPLY DEVICE

(71) Applicant: DENSO CORPORATION, Kariya, Aichi-pref. (JP)

(72) Inventor: Norihiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/750,573

(22) PCT Filed: Jul. 1, 2016

(86) PCT No.: PCT/JP2016/069584
§ 371 (c)(1),
(2) Date: Feb. 6, 2018

(87) PCT Pub. No.: WO2017/038234
PCT Pub. Date: Mar. 9, 2017

(65) Prior Publication Data
US 2019/0010905 A1   Jan. 10, 2019

(30) Foreign Application Priority Data

Sep. 3, 2015 (JP) .................. 2015-173923
Dec. 20, 2015 (JP) .................. 2015-240568

(51) Int. Cl.
*F02M 37/22* (2019.01)
*F02M 37/10* (2006.01)
(Continued)

(52) U.S. Cl.
CPC ............. *F02M 37/22* (2013.01); *B01D 29/27* (2013.01); *B01D 29/31* (2013.01); *B01D 35/005* (2013.01);
(Continued)

(58) Field of Classification Search
CPC .. F02M 37/22; F02M 37/106; F02M 37/0088; F02M 37/0082; F02M 37/50;
(Continued)

(56) References Cited

U.S. PATENT DOCUMENTS 5,395,520 A    3/1995  Ito et al.
9,957,931 B2 *  5/2018  Kobayashi ............. F02M 37/02
(Continued)

FOREIGN PATENT DOCUMENTS

EP    1 553 285    7/2005
JP    2-53109      4/1990
(Continued)

OTHER PUBLICATIONS

Hayashi, et al. U.S. Appl. No. 15/542,525, filed Jul. 10, 2017 (38 pages).

*Primary Examiner* — Madeline Gonzalez
(74) *Attorney, Agent, or Firm* — Nixon & Vanderhye P.C.

(57) ABSTRACT

A suction filter includes a filter element disposed in a fuel tank and filtering a stored fuel that is a fuel stored in the fuel tank by allowing the stored fuel passing the filter element into an inner space, a dividing wall element disposed to divide the inner space into a first space, into which a filtered fuel that is the fuel filtered by the filter element flows, and a second space, to which an intake port drawing in the filtered fuel is opened, and enclosing the first space together with the filter element and enclosing the second space together with the filter element, and a passage element including an inflow port opened to the second space and an outflow port to which an intake pressure is applied by the intake port and defining a flow passage through which filtered fuel flows from the inflow port toward the outflow port.

7 Claims, 12 Drawing Sheets

(51) Int. Cl.
*B01D 35/26* (2006.01)
*B01D 29/31* (2006.01)
*B01D 35/00* (2006.01)
*F02M 37/50* (2019.01)
*B01D 29/27* (2006.01)
*B01D 35/027* (2006.01)
*F02M 37/00* (2006.01)
*B60K 15/03* (2006.01)

(52) U.S. Cl.
CPC ......... *B01D 35/0273* (2013.01); *B01D 35/26* (2013.01); *F02M 37/0082* (2013.01); *F02M 37/0088* (2013.01); *F02M 37/10* (2013.01); *F02M 37/106* (2013.01); *F02M 37/50* (2019.01); *B60K 15/03* (2013.01); *B60K 2015/03236* (2013.01)

(58) Field of Classification Search
CPC ...... F02M 37/10; B01D 35/26; B01D 35/005; B01D 29/31; B01D 35/0273; B01D 29/27; B60K 2015/03236; B60K 15/03
USPC .................. 210/416.4, 172.2, 172.3, 172.4
See application file for complete search history.

(56) References Cited

U.S. PATENT DOCUMENTS

| | | |
|---|---|---|
| 2002/0017485 A1 | 2/2002 | Ito et al. |
| 2003/0042185 A1 | 3/2003 | Dockery |
| 2003/0080046 A1 | 5/2003 | Ito |
| 2005/0274361 A1 | 12/2005 | Ikeya |
| 2006/0076287 A1* | 4/2006 | Catlin ................ B01D 35/0273 210/416.4 |
| 2009/0294343 A1* | 12/2009 | Pekarsky ............... B01D 29/05 210/167.08 |
| 2011/0192786 A1 | 8/2011 | Nagai et al. |
| 2017/0138323 A1 | 5/2017 | Kobayashi et al. |

FOREIGN PATENT DOCUMENTS

| | | |
|---|---|---|
| JP | 4-79962 | 7/1992 |
| JP | 2004-19603 | 1/2004 |
| JP | 2007-224748 | 9/2007 |
| JP | 2012-67736 | 4/2012 |

* cited by examiner

SUCTION FILTER AND FUEL SUPPLY DEVICE

CROSS REFERENCE TO RELATED APPLICATION

This application is the U.S. national phase of International Application No. PCT/JP2016/069584 filed Jul. 1, 2016, which designated the U.S. and claims priority to Japanese Patent Application No. 2015-173923 filed on Sep. 3, 2015 and Japanese Patent Application No. 2015-240568 filed on Dec. 9, 2015, the entire contents of each of which are hereby incorporated herein by reference.

TECHNICAL FIELD

The present disclosure relates to a suction filter and a fuel supply device including the suction filter.

BACKGROUND ART

A conventional fuel supply device that supplies fuel from a fuel tank of a vehicle to an exterior of the fuel tank uses a fuel pump disposed in the fuel tank to draw fuel into an intake port of the fuel pump and discharges the fuel toward the exterior of the fuel tank. As one type of such a fuel supply device, a device disclosed in Patent Literature 1 is provided with a suction filter such that fuel is filtered within a fuel tank and then drawn into an intake port of a fuel pump.

The suction filter disclosed in Patent Literature 1 includes a filter element disposed in the fuel tank. The filter element allows passage of stored fuel being the fuel stored in the fuel tank into an inner space to filter the stored fuel while forming a liquid film. The liquid film remains while the outer surface of the filter element is in contact with the stored fuel. Now, the outer space of the filter element of the suction filter disclosed in Patent Literature 1 is partially covered with a storage member in the fuel tank. The outer surface of the filter element can thus partially remain in contact with the fuel trapped between the filter element and the storage member even when the liquid surface tilted by imbalanced storage of the stored fuel in the fuel tank at the time of turning of the vehicle or the like is separated from the filter element. As a result, the filter element maintaining formation of the liquid film allows fuel to be predominantly drawn into the inner space in which the intake port is opened, thereby preventing air from being drawn into the intake port.

PRIOR ART LITERATURE

Patent Literature

Patent Literature 1: JP2012-67736A

SUMMARY OF INVENTION

According to the suction filter disclosed in Patent Literature 1, an inflow hole is formed on the storage member in order to allow fuel to flow in between the filter element and the storage member. The fuel between the filter element and the storage member at the time of turning of the vehicle or the like is therefore more likely to leak out through the inflow hole as the liquid surface is tilted. The amount of fuel trapped between the filter element and the storage member is thus decreased and depleted in a short time as fuel intake progresses, whereby the formation of the liquid film cannot be maintained. As a result, when the air is drawn into the inner space from the outer space of the filter element, a large amount of fuel remains in the inner space without being drawn into the intake port. The filtered fuel remains in the inner space because only the air is drawn into the intake port when the volume ratio of air in the inner space reaches a certain ratio or higher. Such intake of air greatly changes the discharge performance of a fuel pump and thus requires improvement.

It is an object of the present disclosure to provide a suction filter that stabilizes the discharge performance of a fuel pump, and a fuel supply device including the suction filter.

According to a first aspect of the present disclosure, the suction filter that filters a fuel in a fuel tank of a vehicle and then allows the fuel to be drawn into an intake port of a fuel pump includes a filter element disposed in the fuel tank and filtering a stored fuel that is the fuel stored in the fuel tank, by allowing the stored fuel passing the filter element into an inner space, a dividing wall element disposed to divide the inner space into a first space, into which a filtered fuel that is the fuel filtered by the filter element flows, and a second space, to which the intake port drawing in the filtered fuel is opened, and enclosing the first space together with the filter element and enclosing the second space together with the filter element, and a passage element including an inflow port opened to the second space and an outflow port to which an intake pressure is applied by the intake port, and defining a flow passage through which the filtered fuel flows from the inflow port toward the outflow port.

According to a second aspect of the present disclosure, the fuel supply device that supplies a fuel from a fuel tank of a vehicle to an exterior of the fuel tank includes a fuel pump to discharge the fuel drawn into an intake port from the fuel tank to the exterior of the fuel tank, and the suction filter according to the first aspect.

According to the first aspect and the second aspect, a liquid film is formed on the filter element disposed in the fuel tank by the passage of the stored fuel from the fuel tank into the inner space. A leakage of the stored fuel from the inner space can thus be prevented even when the liquid surface is tilted due to imbalanced storage of the stored fuel and is separated from the filter element in the fuel tank at the time of turning of the vehicle or the like.

The dividing wall element according to the first aspect and the second aspect is disposed to divide the inner space of the filter element into the first space into which the filtered fuel filtered by the filter element flows and the second space in which the intake port of the fuel pump is opened. A liquid film is formed on the dividing wall element by the passage of the filtered fuel from the first space into the second space. As a result, the filtered fuel can be trapped in the first space enclosed by the dividing wall element together with the filter element forming the liquid film as described above.

The first aspect and the second aspect can thus be adapted such that the filtered fuel in the first space remains in contact with the dividing wall element with the amount of the fuel trapped being secured by the filter element, even when the liquid surface of the stored fuel is tilted in the fuel tank. As a result, the liquid film remains on the dividing wall element enclosing the second space together with the filter element. The filtered fuel can thus be drawn from the first space into the second space in which the intake port is opened. Such drawing action allows for an effective use of the filtered fuel in the first space to be able to prevent air from being drawn into the intake port, and is thus effective in terms of stabilizing the discharge performance of the fuel pump.

The passage element according to the first aspect and the second aspect defines the flow passage from the inflow port opened to the second space toward the outflow port to which the intake pressure is applied by the intake port. Accordingly, even when air is drawn into the second space from the first space in which the filtered fuel is substantially depleted, the filtered fuel is introduced by the air that is a bubble shape and is drawn and the filtered fuel flows from the outflow port through the flow passage into the inflow port to which the intake pressure is applied. As a result, the filtered fuel flowing into the inflow port flows through the flow passage by the action of the intake pressure and flows out to the intake port from the outflow port. Therefore, not only the filtered fuel around the intake port but also the filtered fuel around the inflow port separated from the intake port can be drawn into the intake port in the second space.

Such drawing action allows for an effective use of not only the filtered fuel in the first space but also the filtered fuel in the second space to be able to prevent air from being drawn into the intake port, and can thus stabilize the discharge performance of the fuel pump.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
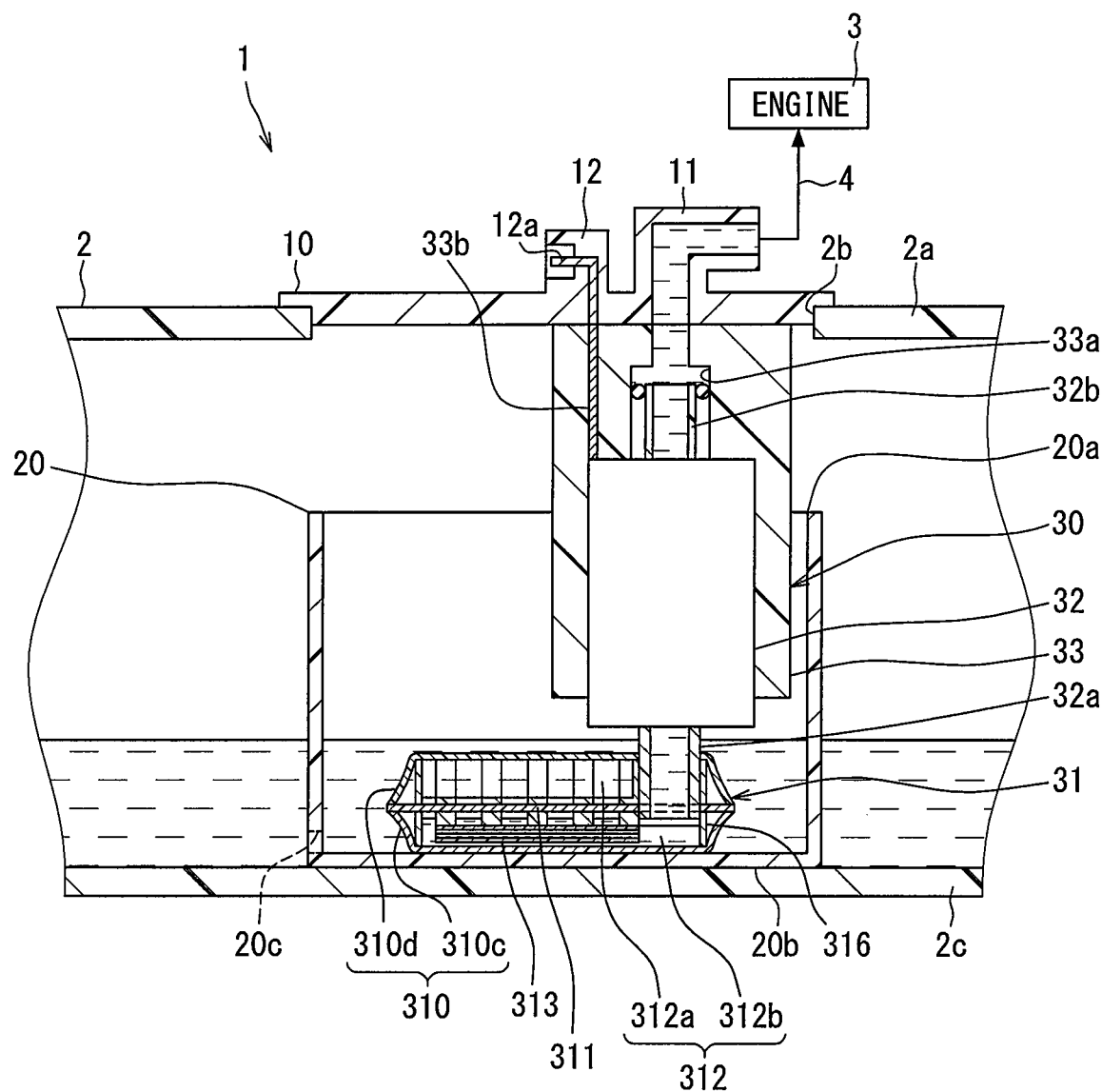
FIG. 1 is a cross-sectional view illustrating a fuel supply device according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

As illustrated in FIG. 1, a fuel supply device 1 according to a first embodiment of the present disclosure is mounted in a fuel tank 2 of a vehicle. The fuel supply device 1 supplies fuel in the fuel tank 2 to an internal combustion engine 3 outside the fuel tank 2. The fuel tank 2 equipped with the fuel supply device 1 is made of resin and formed into a hollow shape, thereby storing fuel to be supplied to the internal combustion engine 3. The internal combustion engine 3 receiving the supply of fuel from the fuel supply device 1 may be a gasoline engine or a diesel engine. Note that a horizontal direction and a vertical direction of the vehicle on a level surface substantially coincide with a horizontal direction and a vertical direction in FIG. 1, respectively.

The overall structure of the fuel supply device 1 will be described first.

The fuel supply device 1 includes a flange 10, a sub tank 20, and a pump unit 30.

The flange 10 is made of hard resin and formed into the shape of a disc. The flange 10 is attached to a top plate 2a of the fuel tank 2. The flange 10 closes a through hole 2b passing through the top plate 2a.

The flange 10 has a fuel supply pipe 11 and an electrical connector 12 that are formed as one piece. The fuel supply pipe 11 communicates with the pump unit 30 in the fuel tank 2. The fuel supply pipe 11 also communicates with a fuel line 4 between the fuel supply pipe and the internal combustion engine 3 outside the fuel tank 2. The fuel supply pipe 11 communicating in such a manner supplies fuel drawn into the fuel tank 2 by a fuel pump 32 of the pump unit 30 to the internal combustion engine 3 outside the fuel tank 2. A metal terminal 12a is buried in the electrical connector 12. The metal terminal 12*a* is electrically connected to the pump unit 30 in the fuel tank 2. The metal terminal 12*a* is also electrically connected to an external control circuit outside the fuel tank 2. Such electrical connection allows the external control circuit to control the fuel pump 32 of the pump unit 30.

The sub tank 20 is made of hard resin and formed into the shape of a bottomed cylinder. The sub tank 20 is disposed in the fuel tank 2 with an opening 20*a* facing upward. The sub tank 20 has a bottom 20*b* placed on a bottom 2*c* of the fuel tank 2. An inflow port 20*c* passes through the sub tank 20 near the bottom 20*b* of the sub tank. Such inflow port passing through allows stored fuel, which is the fuel stored in the fuel tank 2, to flow into the sub tank 20 through the inflow port 20*c*.

The pump unit 30 is disposed to extend in and out of the sub tank 20 in the fuel tank 2. The pump unit 30 is provided with a suction filter 31, the fuel pump 32, and a communicating member 33.

The suction filter 31 is formed into a flat shape as a whole. The suction filter 31 is accommodated in the fuel tank 2 and placed on the bottom 20*b* of the sub tank 20. The suction filter 31 traps foreign matter contained in the stored fuel by filtering the stored fuel flowing into the sub tank 20 of the fuel tank 2.

The fuel pump 32 is an electric pump formed into a cylindrical shape as a whole. The fuel pump 32 is accommodated in the fuel tank 2 and extends from above the suction filter 31 in the sub tank 20 to an exterior of the sub tank 20. An intake port 32*a* of the fuel pump 32 communicates with the suction filter 31. The fuel pump 32 is controlled by the external control circuit for operation. The fuel pump 32 in operation draws filtered fuel, which is the fuel filtered by the suction filter 31 in the sub tank 20 of the fuel tank 2, through the intake port 32*a*. The filtered fuel drawn into the intake port 32*a* is then pressurized in the fuel pump 32 and discharged from a discharge port 32*b* of the fuel pump 32 toward the internal combustion engine 3 outside the fuel tank 2.

The communicating member 33 is made of hard resin and formed into a hollow shape. The communicating member 33 is accommodated in the fuel tank 2 and fixed to the flange 10, and extends from the periphery of the fuel pump 32 in the sub tank 20 to the exterior of the sub tank 20. The communicating member 33 defines a communicating passage 33*a* that communicates with the discharge port 32*b* and the fuel supply pipe 11. The communicating passage 33*a* supplies the fuel discharged from the discharge port 32*b* by the fuel pump 32 toward the internal combustion engine 3 through the fuel supply pipe 11. A metal lead wire 33*b* is buried in the communicating member 33 in order to electrically connect the fuel pump 32 to the metal terminal 12*a*.

Figure 2:
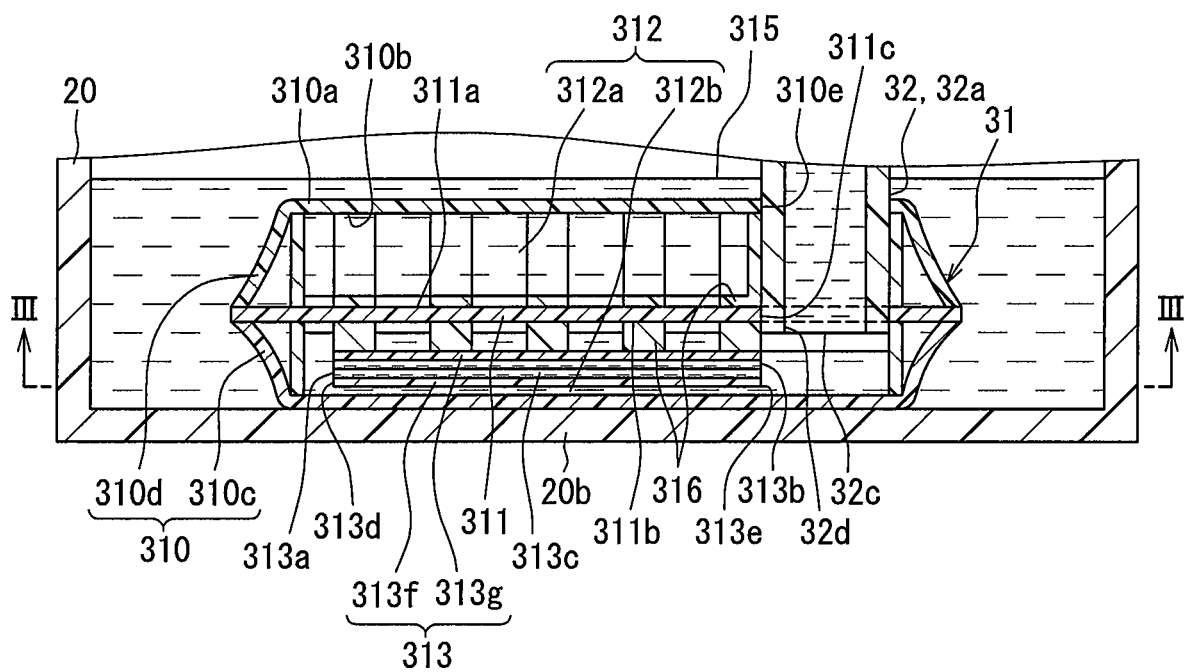
FIG. 2 is an enlarged cross-sectional view of a suction filter according to the first embodiment and corresponds to a cross-sectional view taken along line II-II of FIG. 3.

The detailed structure of the suction filter 31 will now be described. As illustrated in FIGS. 1 and 2, the suction filter 31 includes a filter element 310 and a dividing wall element 311 in the sub tank 20 of the fuel tank 2.

The filter element 310 is formed into the shape of a hollow bag within the sub tank 20 of the fuel tank 2 as illustrated in FIG. 2 such that an outer surface 310*a* is exposed and an inner space 312 is enclosed with an inner surface 310*b*. The filter element 310 is formed by joining the outer peripheral edges of a pair of filter sheets 310*c* and 310*d* together in a liquid-tight manner.

Here, each of the filter sheets 310*c* and 310*d* as a whole is made of material fulfilling a filtration function such as porous resin, a woven fabric, a nonwoven fabric, resin mesh, metal mesh, or the like and formed into the shape of a soft or hard curved film. The roughness of a mesh of each of the filter sheets 310*c* and 310*d* is set to be able to trap minute foreign matter with the outer diameter of 10 μm or larger, for example, as the foreign matter contained in the stored fuel flowing into the sub tank 20 from inside the fuel tank 2, for example.

In the filter element 310, the upper filter sheet 310*d* joined to the upper side of a lower filter sheet 310*c* has a through hole 310*e*. The intake port 32*a* of the fuel pump 32 passes through the through hole 310*e* from an outer space 315 of the filter element 310 toward the inner space 312. The through hole 310*e* is joined liquid-tightly to the intake port 32*a* above an opening portion 32*c* of the intake port 32*a* facing downward.

The through hole formed in the aforementioned pass-through and joining modes allow the upper filter sheet 310*d* of the filter element 310 to be supported by the fuel tank 2 via the pump unit 30 and the flange 10, as illustrated in FIGS. 1 and 2. As a result, a part of the lower filter sheet 310*c* of the filter element 310 is in contact with the bottom 20*b* of the sub tank 20.

The filter element 310 structured as described above exerts the filtration function by trapping foreign matter at a passage of the stored fuel at the time of allowing the stored fuel flowing into the sub tank 20 from the fuel tank 2 to pass the filter element 310 into the inner space 312. The passage of the stored fuel at this time are voids in micropores when the filter element 310 is made of porous resin, voids in fibers when the filter element is made of a woven fabric or a nonwoven fabric, or voids in the mesh when the filter element is made of resin mesh or metal mesh.

The stored fuel is trapped in the voids by surface tension at such passage, so that a liquid film covering the outer surface 310*a* of the filter element 310 is formed simultaneously with exertion of the filtration function. That is, the filter element 310 exerts the filtration function of the stored fuel while forming the liquid film on the outer surface 310*a*. The roughness of the mesh of the filter element 310 is set such that the minimum spacing of the voids being the passage equals approximately 10 μm, for example, in order to collect the foreign matter having the outer diameter as described above at the passage of the stored fuel.

In contrast to the filter element 310, the dividing wall element 311 is exposed in the inner space 312 of the filter element 310 within the sub tank 20 of the fuel tank 2. The dividing wall element 311 that is a diaphragm shape is disposed to define a first space 312*a* and a second space 312*b* above and below the dividing wall element, respectively. In the present embodiment, most of the dividing wall element 311 except for the outer peripheral edge thereof is accommodated in the entire inner space 312 so that the entire inner space is divided completely.

As illustrated in FIG. 2, the dividing wall element 311 is joined to the outer peripheral edges of the filter sheets 310*c* and 310*d* all around between the edges so as to be stretched in the inner space 312. The dividing wall element 311 joined as described above allows the first space 312*a* to be enclosed with the dividing wall element and the upper filter sheet 310*d*, so that an upper surface 311*a* of the dividing wall element 311 is exposed in the first space 312*a*. At the same time, the second space 312*b* is enclosed with the dividing wall element 311 and the lower filter sheet 310*c*, so that a lower surface 311*b* of the dividing wall element 311 is exposed in the second space 312*b*.

The dividing wall element 311 as a whole is made of material fulfilling a filtration function such as porous resin, a woven fabric, a nonwoven fabric, resin mesh, metal mesh, or the like and formed into the shape of a soft or hard flat film. The roughness of the mesh of the dividing wall element 311 is set larger than or equal to the roughness of the mesh of the filter sheets 310c and 310d so as to allow foreign matter passing through the filter element 310 to also pass through the dividing wall element 311.

The dividing wall element 311 has a through hole 311c. The intake port 32a of the fuel pump 32 passes through the through hole 311c from the first space 312a above the dividing wall element 311 toward the second space 312b below the dividing wall element 311. The through hole 311c is joined liquid-tightly to the intake port 32a above the opening portion 32c of the intake port 32a opened to the second space 312b.

The through hole formed in the aforementioned pass-through and joining modes allow the dividing wall element 311 to be supported by the fuel tank 2 via the pump unit 30 and the flange 10, as illustrated in FIGS. 1 and 2. As a result, most of the dividing wall element 311 except for the outer peripheral edge thereof is separated from the upper filter sheet 310d therebelow to secure a predetermined volume for the first space 312a between the dividing wall element 311 and the filter element 310. At the same time, most of the dividing wall element 311 except for the outer peripheral edge thereof is separated from the lower filter sheet 310c thereabove to secure a predetermined volume for the second space 312b between the dividing wall element 311 and the filter element 310. In the present embodiment, the volume secured for the second space 312b is smaller than the volume secured for the first space 312a.

With the volumes secured as described above, the intake pressure by the intake port 32a (the negative intake pressure in this case) can act on the second space 312b directly from the opening portion 32c and on the first space 312a indirectly through the dividing wall element 311. The intake pressure by the intake port 32a can also act on the outer space 315 indirectly through the dividing wall element 311 and the upper filter sheet 310d or indirectly through the lower filter sheet 310c. The opening portion 32c of the intake port 32a is disposed in an upper half in the second space 312b and separated from the lower filter sheet 310c thereabove to be less likely to adsorb the lower filter sheet 310c even under the action of the intake pressure.

The dividing wall element 311 structured as described above allows the filtered fuel being filtered by the upper filter sheet 310d of the filter element 310 and flowing into the first space 312a to pass through the dividing wall element and flow into the second space 312b in which the intake port 32a is opened. The passage of the filtered fuel at this time are voids in micropores when the dividing wall element 311 is made of porous resin, voids in fibers when the dividing wall element is made of a woven fabric or a nonwoven fabric, or voids in the mesh when the dividing wall element is made of resin mesh or metal mesh.

The filtered fuel is trapped in the voids by surface tension at the passage and defines a liquid film covering the upper surface 311a of the dividing wall element 311. The roughness of the mesh of the dividing wall element 311 is set such that the minimum spacing of the voids being the passage equals approximately 10 μm to 100 μm, for example, in order to allow the aforementioned foreign matter to pass through the passage of the filtered fuel. The filtered fuel filtered by the lower filter sheet 310c of the filter element 310 can directly flow into the second space 312b without passing through the dividing wall element 311.

Figure 3:
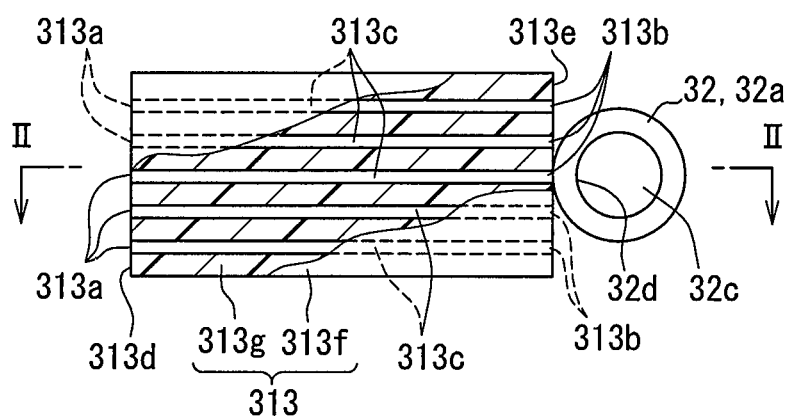
FIG. 3 is an enlarged cross-sectional view of a passage element of the suction filter according to the first embodiment and corresponds to a view taken along an arrow III-III of FIG. 2.

As illustrated in FIGS. 1 to 3, the suction filter 31 includes a passage element 313 and a holding element 316 in combination with the filter element 310 and the dividing wall element 311 in the sub tank 20 of the fuel tank 2.

As illustrated in FIGS. 2 and 3, the passage element 313 is made of hard resin and formed into the shape of a rectangular flat plate provided with a plurality of cylindrical holes. In particular, in the present embodiment, the passage element 313 is formed by joining a pair of passage members 313f and 313g on top of each other in a liquid-tight manner.

The passage element 313 is disposed in a position extending in the horizontal direction from the periphery of the intake port 32a in the second space 312b. In the present embodiment, the passage element 313 is entirely accommodated in the second space 312b. As illustrated in FIGS. 1 and 2, the passage element 313 is held in the inner space 312 of the filter element 310 by the holding element 316 attached to the intake port 32a. Here, the holding element 316 is made of hard resin and substantially formed into the shape of a rib so as to partially expose the surfaces 311a and 311b, and holds the dividing wall element 311 from both sides thereof in the vertical direction. The holding element 316 also holds the filter sheets 310c and 310d of the filter element 310 by protruding toward both sides in the vertical direction from a plurality of sites.

Such a mode of holding of the holding element allows the passage element 313 to be supported by the fuel tank 2 via the pump unit 30 and the flange 10. As a result, the passage element 313 is separated from the dividing wall element 311 therebelow and from the lower filter sheet 310c of the filter element 310 thereabove.

As illustrated in FIGS. 2 and 3, the passage element 313 has an equal number of a plurality of inflow ports 313a, a plurality of outflow ports 313b, and a plurality of flow passages 313c. Specifically, the inflow ports 313a are opened on a separated side surface 313d of the passage element 313. The separated side surface is positioned in the second space 312b separated from the opening portion 32c of the intake port 32a in the horizontal direction. The filtered fuel can flow from the second space 312b into the inflow ports 313a that are opened on the separated side surface 313d in the second space 312b.

The outflow ports 313b are opened on a peripheral side surface 313e of the passage element 313. The peripheral side surface is positioned in the second space 312b around the opening portion 32c on the side opposite to the side of the separated side surface 313d in the horizontal direction. In particular, in the present embodiment, the outflow ports 313b are provided on the peripheral side surface 313e below the opening portion 32c and on the outer peripheral side of the opening portion 32c relative to an inner peripheral surface 32d thereof. The intake pressure by the intake port 32a can act through the opening portion 32c on the outflow ports 313b that are opened on the peripheral side surface 313e in the second space 312b.

The flow passages 313c extend straight in the horizontal direction and substantially parallel to one another between the separated side surface 313d and the peripheral side surface 313e of the passage element 313. Each of the flow passages 313c communicates with the corresponding inflow port 313a and outflow port 313b therebetween. The filtered fuel can flow through each flow passage 313c communicating in the aforementioned manner from the corresponding inflow port 313a toward the corresponding outflow port 313b.

The action and effect of the first embodiment described so far will be described below.

In the first embodiment, a liquid film is formed on the filter element 310 disposed in the fuel tank 2 by the passage of the stored fuel from the fuel tank 2 into the inner space 312. A leakage of the stored fuel from the inner space 312 can thus be prevented even when the liquid surface is tilted due to imbalanced storage of the stored fuel as illustrated in FIG. 4 and is separated from the filter sheets 310c and 310d of the filter element 310 in the sub tank 20 of the fuel tank 2 at the time of turning of the vehicle or the like.

The dividing wall element 311 according to the first embodiment is disposed to divide the inner space 312 into the first space 312a into which the filtered fuel filtered by the filter element 310 flows and the second space 312b in which the intake port 32a of the fuel pump 32 is opened. A liquid film is formed on the dividing wall element 311 by the passage of the filtered fuel from the first space 312a into the second space 312b. As a result, the filtered fuel can be trapped as illustrated in FIG. 4 in the first space 312a enclosed by the dividing wall element 311 together with the filter element 310 forming the liquid film as described above.

Figure 4:
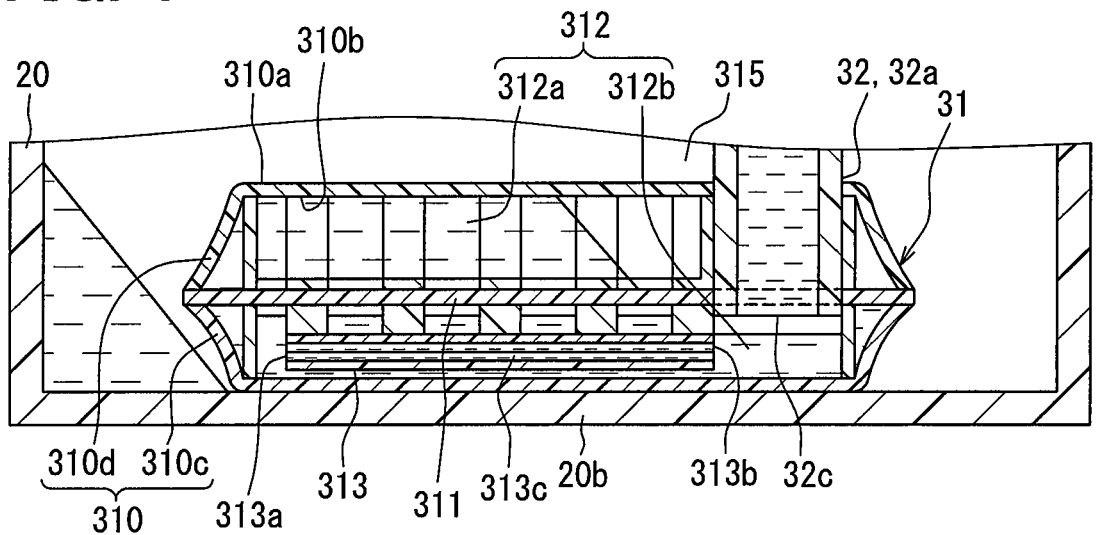
FIG. 4 is a cross-sectional view illustrating the action and effect of the suction filter according to the first embodiment.

The first embodiment can thus be adapted such that the filtered fuel in the first space 312a remains in contact with the dividing wall element 311 as illustrated in FIG. 4 with the amount of the fuel trapped being secured by the filter element 310, even when the liquid surface of the stored fuel is tilted in the sub tank 20. As a result, the liquid film remains on the dividing wall element 311 enclosing the second space 312b together with the filter element 310. The filtered fuel can thus be drawn from the first space 312a into the second space 312b in which the intake port 32a is opened. Such drawing action allows for an effective use of the filtered fuel in the first space 312a to be able to prevent air from being drawn into the intake port 32a, and is thus effective in terms of stabilizing the discharge performance of the fuel pump 32.

As illustrated in FIG. 4, the passage element 313 according to the first embodiment defines the flow passage 313c from the inflow port 313a opened to the second space 312b toward the outflow port 313b to which the intake pressure is applied by the intake port 32a. Accordingly, even when air is drawn into the second space 312b from the first space 312a in which the filtered fuel is substantially depleted, the filtered fuel is introduced by the air that is a bubble shape and is drawn and the filtered fuel flows from the outflow port 313b through the flow passage 313c into the inflow port 313a to which the intake pressure is applied. As a result, the filtered fuel flowing into the inflow port 313a flows through the flow passage 313c by the action of the intake pressure and flows out to the intake port 32a from the outflow port 313b. Therefore, not only the filtered fuel around the intake port 32a but also the filtered fuel around the inflow port 313a separated from the intake port 32a can be drawn into the intake port 32a in the second space 312b.

Such drawing action allows for an effective use of not only the filtered fuel in the first space 312a but also the filtered fuel in the second space 312b to be able to prevent air from being drawn into the intake port 32a, and can thus stabilize the discharge performance of the fuel pump 32. The discharge performance of the fuel pump 32 is stabilized in the first embodiment in which the fuel discharged from the fuel pump 32 is supplied to the internal combustion engine 3 outside the fuel tank 2, so that the vehicle can ensure drivability and acceleration performance as well as avoid running out of gas and engine stall.

According to the first embodiment, the intake pressure by the intake port 32a acts more easily on the outflow port 313b positioned around the opening portion 32c of the intake port 32a that is opened to the second space 312b. Thus, even when the air is drawn into the second space 312b from the first space 312a, the intake pressure acting on the inflow port 313a from the outflow port 313b is secured large to be able to surely draw the filtered fuel to be introduced by the air into the intake port 32a. Such drawing action can improve the level of effective use of the filtered fuel and thus stability of the discharge performance of the fuel pump 32. Moreover, with the outflow port 313b positioned around the opening portion 32c of the intake port 32a, the design of the fuel pump 32 such as the shape of the intake port 32a need not be changed.

According to the first embodiment, the intake pressure by the intake port 32a acts from the outflow port 313b on the inflow port 313a through the flow passage 313c, the inflow port 313a being disposed in the second space 312b separated from the intake port 32a in the horizontal direction. Therefore, even the filtered fuel around the inflow port 313a separated from the intake port 32a in the horizontal direction can surely be drawn into the intake port 32a in the second space 312b. Such drawing action can improve the level of effective use of the filtered fuel and thus stability of the discharge performance of the fuel pump 32.

In the first embodiment, the volume of the second space 312b is smaller than the volume of the first space 312a. Accordingly, when the air is drawn into the second space 312b from the first space 312a, the amount of filtered fuel remaining in the second space 312b without being drawn into the intake port 32a can be reduced. The amount of filtered fuel remaining can be reduced as the volume of the second space 312b is smaller because, when the volume ratio of air occupying the second space 312b reaches a predetermined ratio or higher, only the air is substantially drawn into the intake port 32a with the filtered fuel remaining in the second space 312b. The first embodiment can thus improve the effect of effectively using the filtered fuel in the second space 312b and thus stability of the discharge performance of the fuel pump 32.

According to the first embodiment, the dividing wall element 311 that is a diaphragm shape is disposed to define the first space 312a and the second space 312b above and below the dividing wall element, respectively. The liquid film thus remains on the dividing wall element 311 in the sub tank 20 until the liquid surface drops by the reduction in the stored fuel and reaches the second space 312b, so that the filtered fuel can be stored in the second space 312b. As a result, the stability of the discharge performance of the fuel pump 32 can be improved by preventing air from being drawn into the intake port 32a until the filtered fuel in the first space 312a is substantially depleted.

In the first embodiment, the roughness of the mesh of the dividing wall element 311 through which the filtered fuel passes is set larger than or equal to the roughness of the mesh of the filter element 310 through which the stored fuel passes. Therefore, the dividing wall element 311 structured to divide the inner space 312 of the filter element 310 and thus having a smaller surface area than the filter element 310 can prevent clogging of foreign matter allowed to pass through the filter element 310. The roughness of the mesh that is set can thus prevent a reduction in the stability of the discharge performance of the fuel pump 32 caused by clogging in the dividing wall element 311.

(Second Embodiment)

Figure 5:
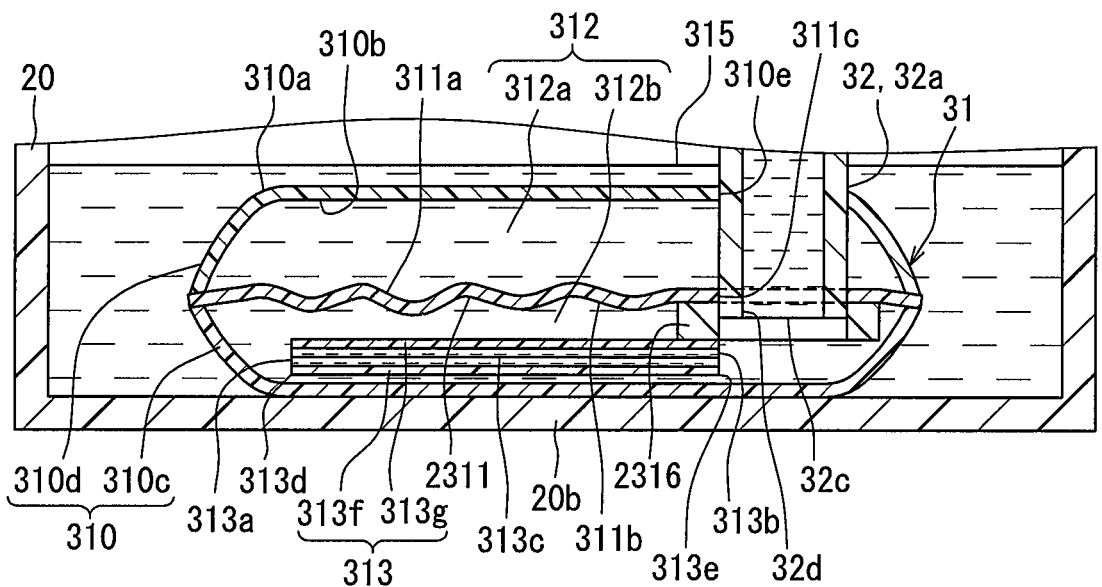
FIG. 5 is an enlarged cross-sectional view of a suction filter according to a second embodiment.

As illustrated in FIG. 5, a second embodiment of the present disclosure is a variation of the first embodiment.

A dividing wall element 2311 according to the second embodiment is made of material such as porous resin, a woven fabric, a nonwoven fabric, resin mesh, metal mesh, or the like and formed into the shape of a diaphragm that is soft and flexible. The dividing wall element 2311 is joined to the outer peripheral edges of filter sheets 310c and 310d all around between the edges and is disposed in a corrugated, slack manner to be able to expand or contract the second space 312b. Except for the flexibility and the slack structure, the dividing wall element 2311 has substantially the same structure as the dividing wall element 311 of the first embodiment. In the second embodiment, a holding element 2316 for holding the dividing wall element 2311 from therebelow is made of hard resin, substantially formed into the shape of a cylinder, and attached to the intake port 32a.

Figure 6:
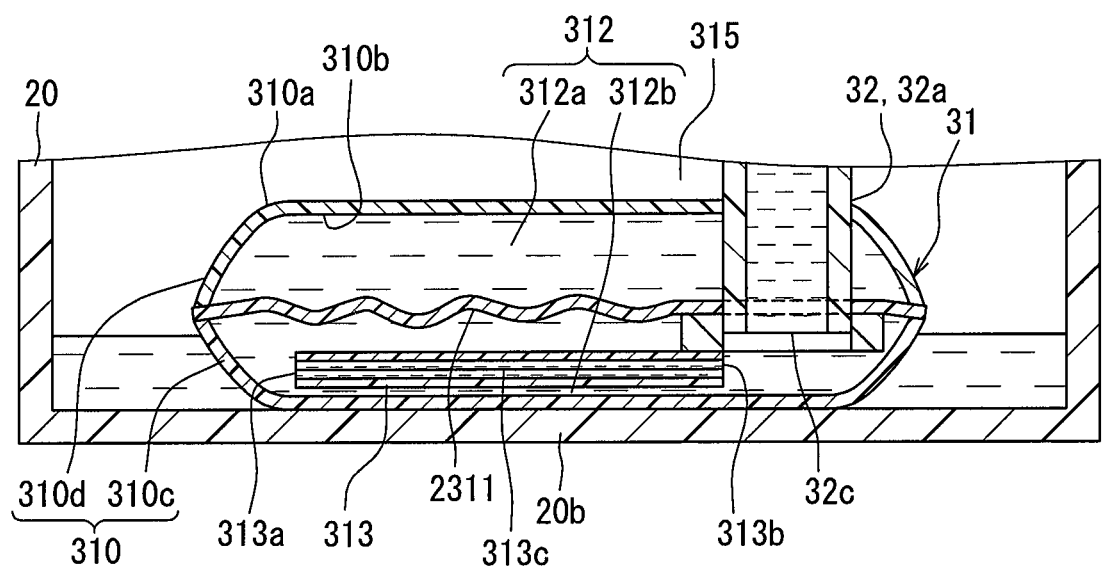
FIG. 6 is a cross-sectional view of the suction filter according to the second embodiment in a state different from that in FIG. 5.

The following is the principle of expanding and contracting the second space 312b by the dividing wall element 2311 structured as described above. As illustrated in FIGS. 5 and 6, the inner space 312 is filled with filtered fuel in the sub tank 20 while stored fuel is in contact with at least the lower filter sheet 310c of the filter element 310. At this time, the dividing wall element 2311 is separated from the passage element 313 to maintain the volume of the second space 312b in an expanded state. Note that the volume of the second space 312b at this time may be smaller or larger than or equal to the volume of the first space 312a.

Figure 7:
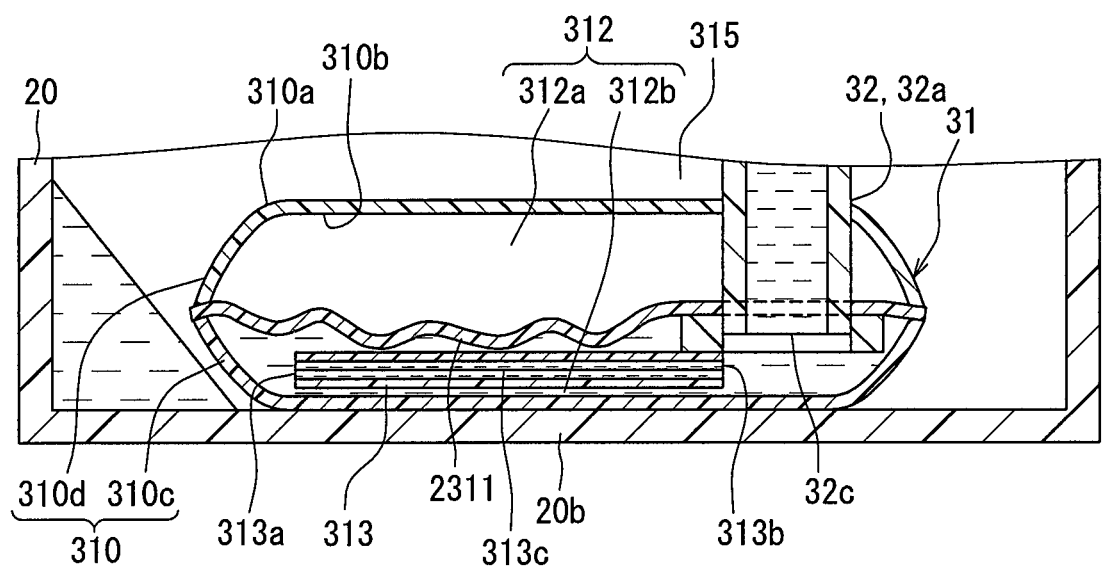
FIG. 7 is a cross-sectional view illustrating the action and effect of the suction filter according to the second embodiment.

On the other hand, when a liquid surface of the stored fuel is tilted in the sub tank 20 as illustrated in FIG. 7, the filtered fuel in the first space 312a can possibly be substantially depleted according to the intake action from the intake port 32a. The dividing wall element 2311 at this time sags little by little toward the passage element 313 according to the intake action from the intake port 32a, thereby gradually reducing the volume of the second space 312b. Note that the volume of the second space 312b at this time is smaller than the volume of the first space 312a as a result of the gradual reduction.

According to the second embodiment, the dividing wall element 2311 that is flexible and disposed in the slack manner can expand or contract the second space 312b. Therefore, when the filtered fuel in the first space 312a is substantially depleted in response to the intake action from the intake port 32a, the second space 312b contracts by the amount corresponding to the filtered fuel drawn from the second space 312b. It is thus possible to delay the intake of air into the second space 312b from the first space 312a through the dividing wall element 2311 or from the outer space 315 through the lower filter sheet 310c of the filter element 310. When the air is drawn into the second space 312b from the first space 312a, the function of the passage element 313 allows the filtered fuel stored away from the intake port 32a to be drawn into the intake port 32a in the second space 312b. The level of effective use of the filtered fuel in the second space 312b can thus be increased to be able to improve stability of the discharge performance of the fuel pump 32.

(Third Embodiment)

Figure 8:
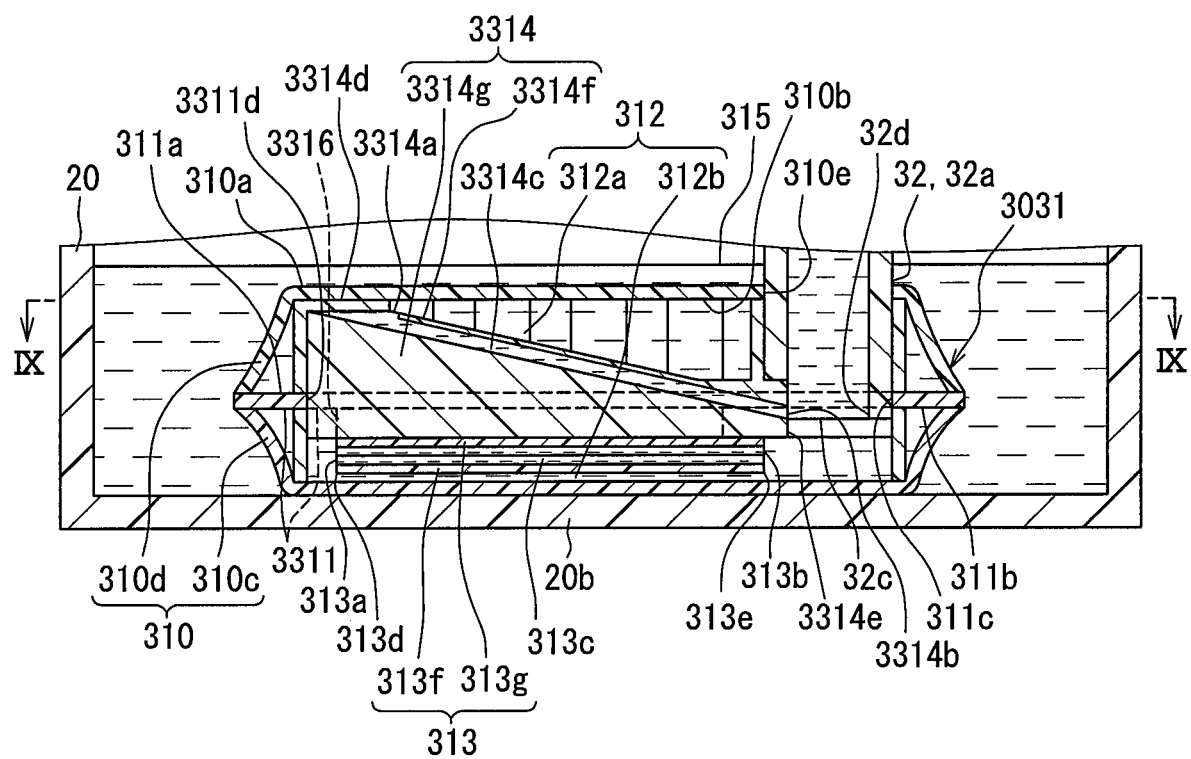
FIG. 8 is an enlarged cross-sectional view of a suction filter according to a third embodiment and corresponds to a cross-sectional view taken along a line VIII-VIII of FIG. 9.

As illustrated in FIG. 8, a third embodiment of the present disclosure is a variation of the first embodiment. A suction filter 3031 according to the third embodiment includes a first passage element 3314 and a second passage element 313 in combination with the filter element 310, a dividing wall element 3311, and a holding element 3316 in the sub tank 20. The structure of the second passage element 313 is substantially the same as the structure of the passage element 313 of the first embodiment. Note that in the third embodiment, the inflow port 313a, the outflow port 313b, and a flow passage 313c of the second passage element 313 are referred to as a second inflow port 313a, a second outflow port 313b, and a second flow passage 313c, respectively. The dividing wall element 3311 has substantially the same structure as the dividing wall element 311 of the first embodiment except that a through hole 3311d through which the first passage element 3314 passes is provided.

Figure 9:
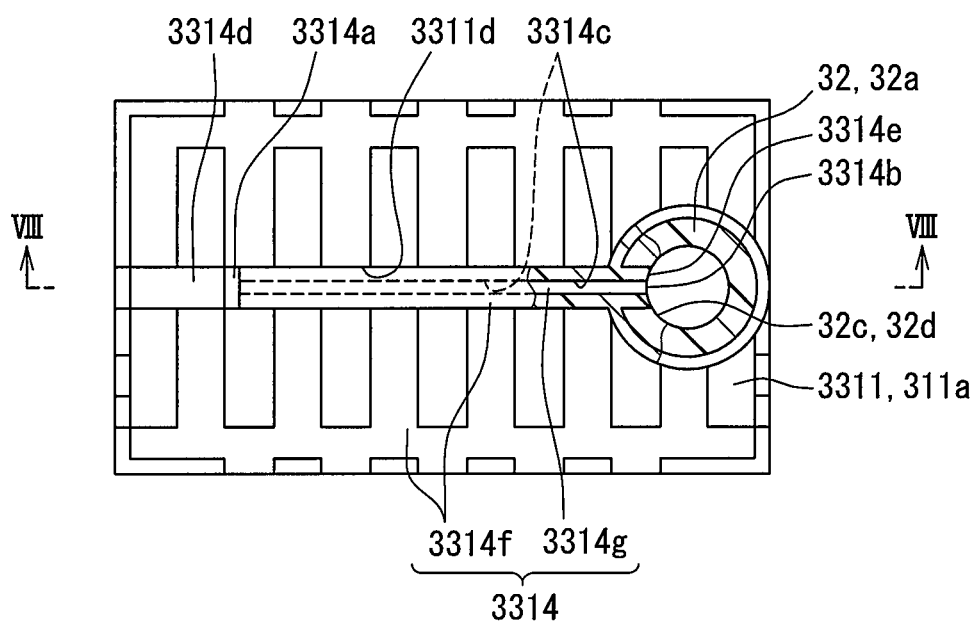
FIG. 9 is an enlarged cross-sectional view of a first passage element of the suction filter according to the third embodiment and corresponds to a cross-sectional view taken along a line IX-IX of FIG. 8.

As illustrated in FIGS. 8 and 9, the first passage element 3314 is made of hard resin and substantially formed into the shape of a trapezoidal flat plate provided with one rectangular hole. In particular, in the third embodiment, the first passage element 3314 is formed by fitting and joining a pair of passage members 3314f and 3314g together in a liquid-tight manner. The first passage element 3314 is disposed in a position extending along the vertical direction from the intake port 32a. The first passage element 3314 passes through the through hole 3311d from the second space 312b below the dividing wall element 3311 toward the first space 312a above the dividing wall element 311. The first passage element 3314 is joined to the through hole 3311d in a liquid-tight manner. The first passage element 3314 is held by the holding element 3316 attached to the intake port 32a. Here, the passage member 3314f provided with a substantially rib-like portion of the first passage element 3314 and the holding element 3316 made of hard resin together fulfill substantially the same function as that of the holding element 316 of the first embodiment.

Such modes of joining and holding allow the first passage element 3314 to be supported by the fuel tank 2 via the pump unit 30 and the flange 10, as is the case with the second passage element 313. As a result, the first passage element 3314 is separated from the lower filter sheet 310c of the filter element 310 therabove.

The first passage element 3314 has one first inflow port 3314a, one first outflow port 3314b, and one first flow passage 3314c. Specifically, the first inflow port 3314a is opened on a separated top surface 3314d of the first passage element 3314. The separated top surface is positioned in the first space 312a separated from the opening portion 32c of the intake port 32a in the horizontal direction. In particular, in the third embodiment, the first inflow port 3314a is positioned in an upper half in the first space 312a, to be provided on the separated top surface 3314d which is separated from the dividing wall element 3311 thereabove and is in contact with the upper filter sheet 310d. Filtered fuel can flow from the first space 312a into the first inflow port 3314a that is opened on the separated top surface 3314d in the first space 312a.

The first outflow port 3314b is opened on a proximity side surface 3314e of the first passage element 3314. The proximity side surface is positioned in the first space 312a in proximity to the opening portion 32c on the side opposite to the side of the separated top surface 3314d in the horizontal direction. In particular, in the third embodiment, the first outflow port 3314b is provided on the proximity side surface 3314e contiguous with the inner peripheral surface 32d of the opening portion 32c, to be positioned above each second outflow port 313b. The intake pressure by the intake port 32a can act through the opening portion 32c on the first outflow ports 3314b that is opened on the proximity side surface 3314e in the second space 312b.

The first flow passage 3314c extends between the separated top surface 3314d and the proximity side surface 3314e of the first passage element 3314 so as to be tilted upward as the passage is separated from the opening portion 32c in the horizontal direction. The first flow passage 3314c communicates with the first inflow port 3314a and the first outflow port 3314b therebetween. The filtered fuel can flow through the first flow passage 3314c communicating in such a manner from the first inflow port 3314a toward the first outflow port 3314b.

As described above, the first passage element 3314 according to the third embodiment defines the first flow passage 3314c from the first inflow port 3314a opened to the first space 312a toward the first outflow port 3314b exposed to the action of the intake pressure by the intake port 32a. The first inflow port 3314a is thus exposed to the action of the intake pressure as well from the first outflow port 3314b through the first flow passage 3314c. The action of the intake pressure causes air to flow into the first inflow port 3314a even when a reduction in stored fuel (such as running out of gas) or imbalanced storage of the stored fuel in the sub tank 20 causes the air to flow into and be trapped in the first space 312a enclosed by the elements 310 and 3311 forming the liquid film. As a result, the air flowing into the first inflow port 3314a flows through the first flow passage 3314c by the action of the intake pressure and flows out to the intake port 32a from the first outflow port 3314b. The trapped air not readily passing through the dividing wall element 3311, on which the liquid film is formed, from the first space 312a is temporarily drawn into the intake port 32a so that the first space 312a can have the volume capable of trapping the filtered fuel back again.

According to the function of the first passage element 3314, the level of effective use of the filtered fuel can be increased both in the first space 312a and the second space 312b together with the function of the second passage element 313 similar to that of the first embodiment. The stability of the discharge performance of the fuel pump 32 can thus be improved.

According to the third embodiment, air having a smaller specific gravity than the filtered fuel tends to accumulate in the upper half in the first space 312a where the first inflow port 3314a is positioned. Thus, when the trapped air in the upper half in the first space 312a is temporarily drawn into the intake port 32a, the first space 312a is more likely to have the volume capable of trapping the filtered fuel back again. As a result, the effective use of the filtered fuel in the first space 312a can particularly be enhanced to be able to contribute to the improvement in the stability of the discharge performance of the fuel pump.

(Other Embodiment)

The present disclosure is not limited to the embodiments mentioned above, and can be changed and modified to various embodiments which are also within the spirit and scope of the present disclosure.

Figure 10:
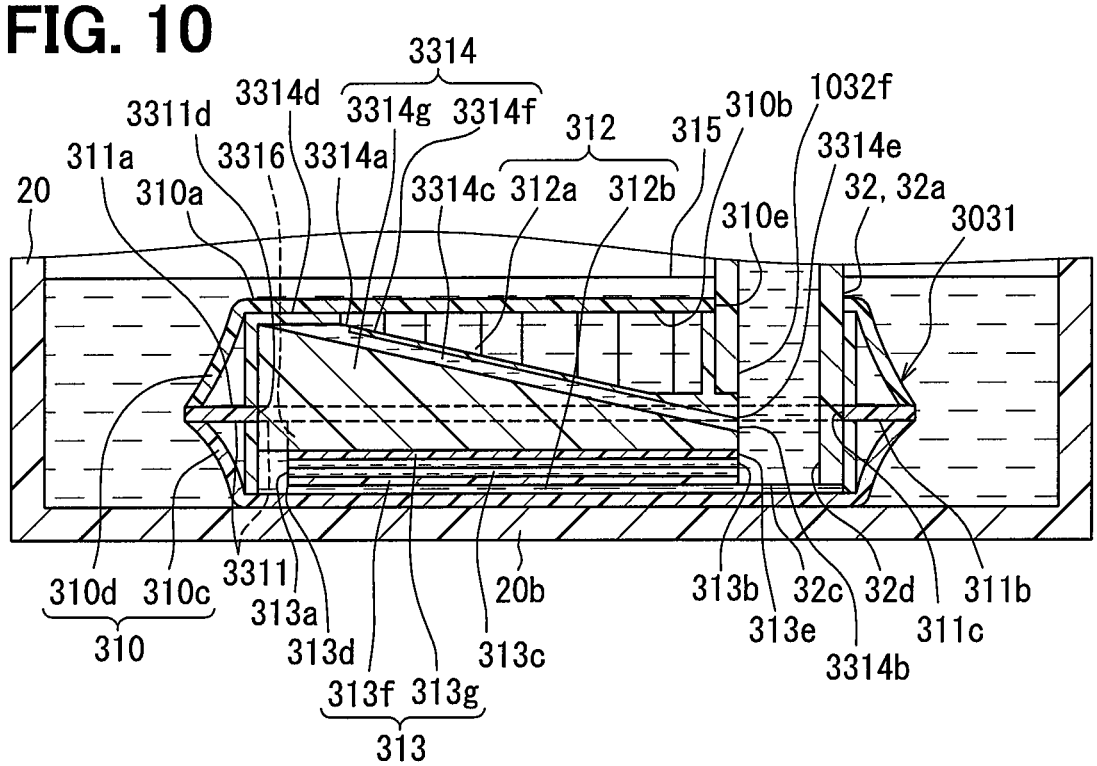
FIG. 10 is a cross-sectional view illustrating a variation of FIG. 8.

Specifically, a first variation related to the first to third embodiments may be provided with at least one outflow port 313b on the peripheral side surface 313e that is separated from the opening portion 32c thereabove and is contiguous with an inner peripheral surface 1032f of the intake port 32a, as illustrated in FIG. 10.

FIG. 10 illustrates the first variation of the third embodiment.

Figure 11:
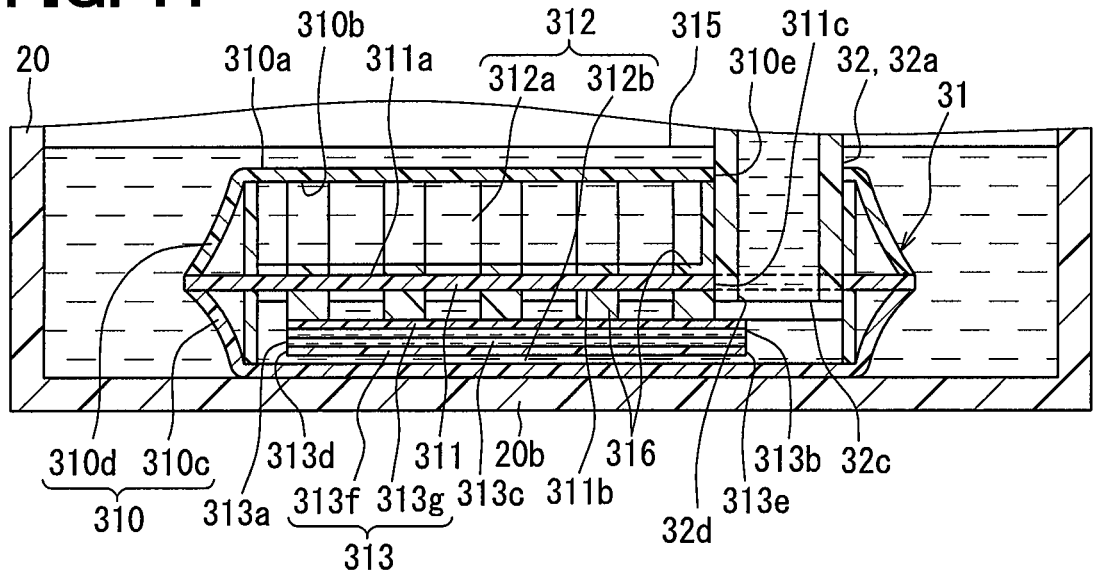
FIG. 11 is a cross-sectional view illustrating a variation of FIG. 2.

A second variation related to the first to third embodiments may be provided with at least one outflow port 313b on the peripheral side surface 313e positioned directly below the opening portion 32c, as illustrated in FIG. 11. FIG. 11 illustrates the second variation of the first embodiment.

Figure 12:
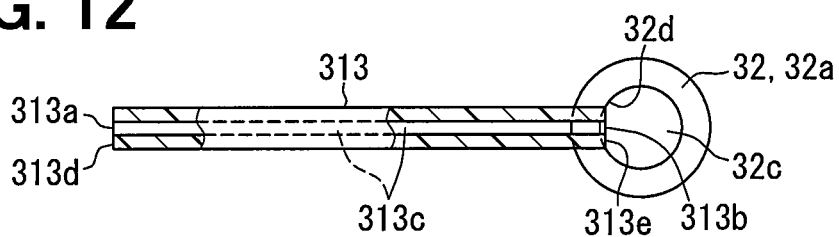
FIG. 12 is a cross-sectional view illustrating a variation of FIG. 3.

A third variation related to the first to third embodiments may form one inflow port 313a, one outflow port 313b, and one flow passage 313c in the passage element 313 provided with a cylindrical hole and having the shape of a pipe, as illustrated in FIG. 12. In the third variation of the first embodiment illustrated in FIG. 12, the outflow port 313b is provided on the peripheral side surface 313e positioned directly below the opening portion 32c, in accordance with the second variation.

Figure 13:
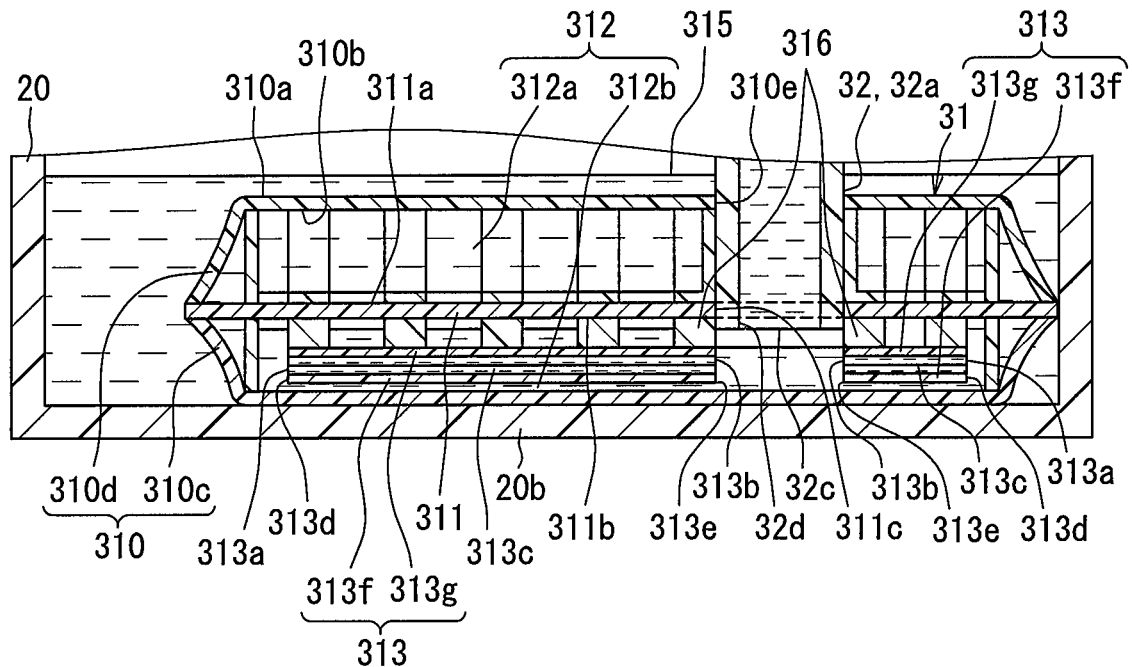
FIG. 13 is a cross-sectional view illustrating a variation of FIG. 2.

A fourth variation related to the first to third embodiments may be provided with the passage element 313 on each of both sides of the intake port 32a while sandwiching the intake port in the horizontal direction, as illustrated in FIG. 13. FIG. 13 illustrates the fourth variation of the first embodiment. A fifth variation related to the third embodiment may be provided with the first passage element 3314 on each of both sides of the intake port 32a while sandwiching the intake port in the horizontal direction, in accordance with the fourth variation.

Figure 14:
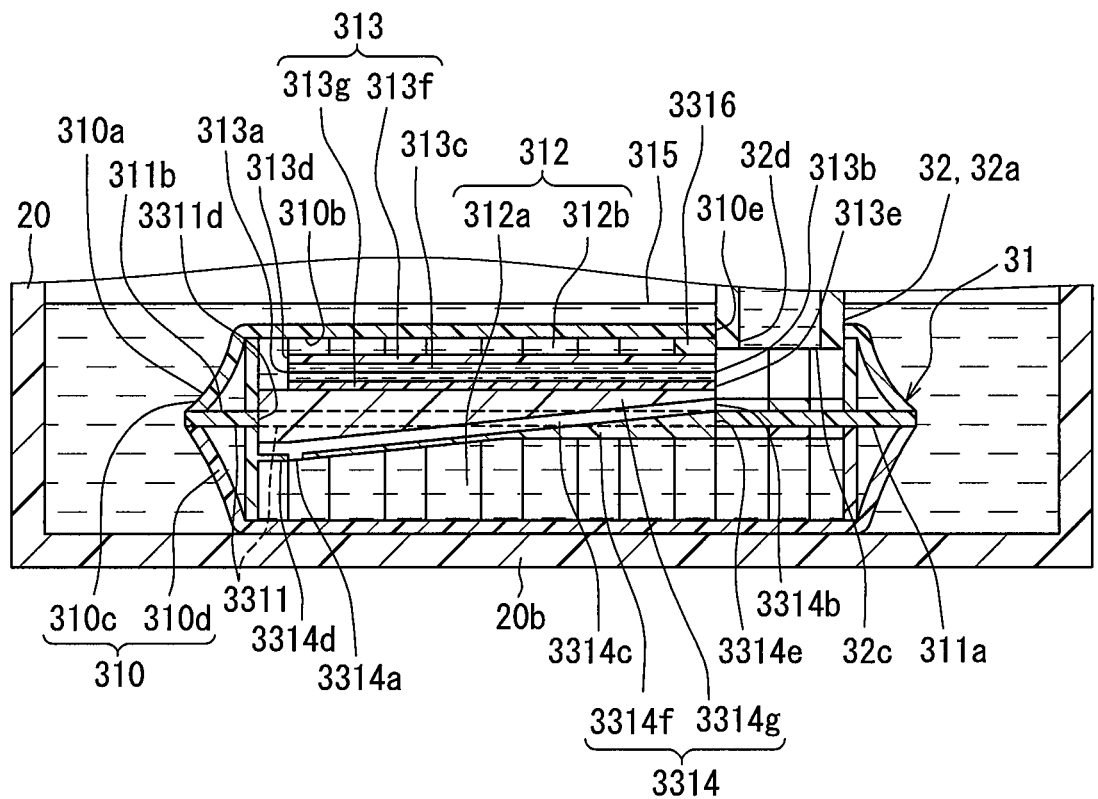
FIG. 14 is a cross-sectional view illustrating a variation of FIG. 8.

A sixth variation related to the first to third embodiments may use dividing wall elements 311, 2311, and 3311 having no through hole 311c and having the shape of a diaphragm to divide the inner space 312 into the first space 312a formed on the lower side of the inner space and the second space 312b formed on the upper side of the inner space 312, as illustrated in FIG. 14. The sixth variation of the third embodiment illustrated in FIG. 14 is provided with the first outflow port 3314b on the proximity side surface 3314e positioned below the opening portion 32c and the second outflow port 313b and on the outer peripheral side of the opening portion 32c relative to the inner peripheral surface 32d thereof. The sixth variation of the third embodiment illustrated in FIG. 14 is also provided the first flow passage 3314c tilted downward as the passage is separated from the opening portion 32c along the horizontal direction. The sixth variation of the third embodiment illustrated in FIG. 14 is further provided with the first inflow port 3314a positioned in the upper half in the first space 312a below the dividing wall element 3311.

Figure 15:
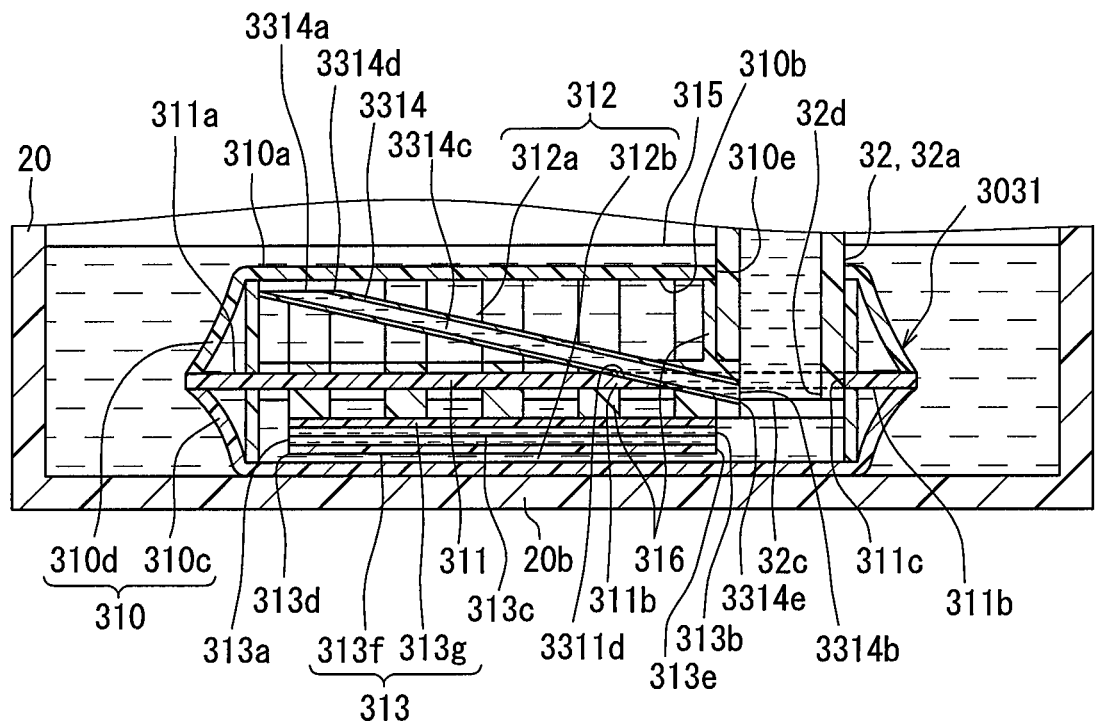
FIG. 15 is a cross-sectional view illustrating a variation of FIG. 8.

A seventh variation related to the third embodiment may form one first inflow port 3314a, one first outflow port 3314b, and one first flow passage 3314c in the first passage element 3314 provided with a cylindrical hole and having the shape of a pipe, as illustrated in FIG. 15. An eighth variation related to the third embodiment may form a plurality of first inflow ports 3314a, a plurality of first outflow ports 3314b, and a plurality of first flow passages 3314c in accordance with the first embodiment.

Figure 16:
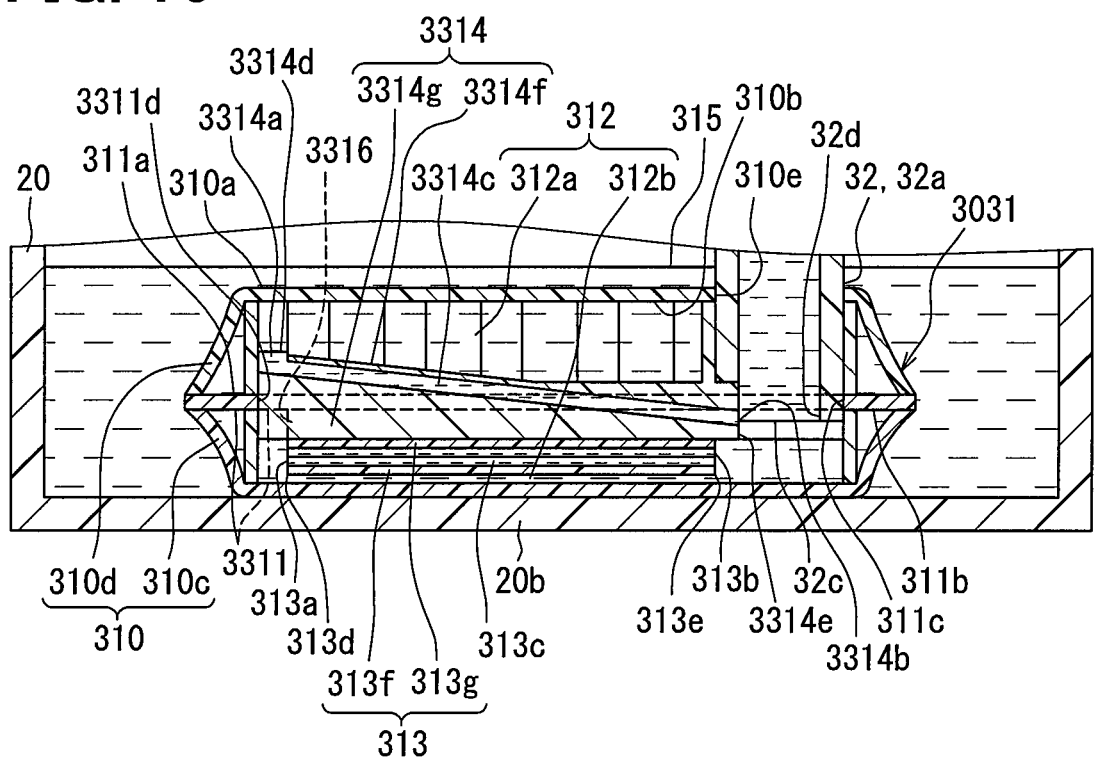
FIG. 16 is a cross-sectional view illustrating a variation of FIG. 8.
Figure 17:
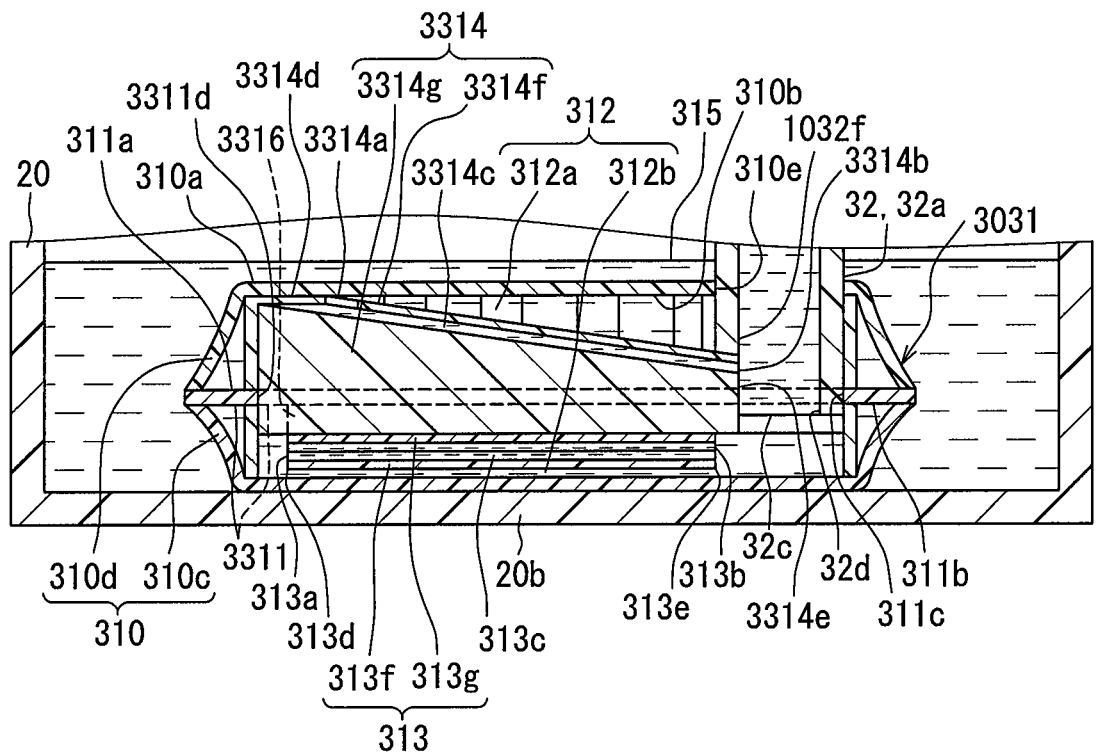
FIG. 17 is a cross-sectional view illustrating a variation of FIG. 8.
Figure 18:
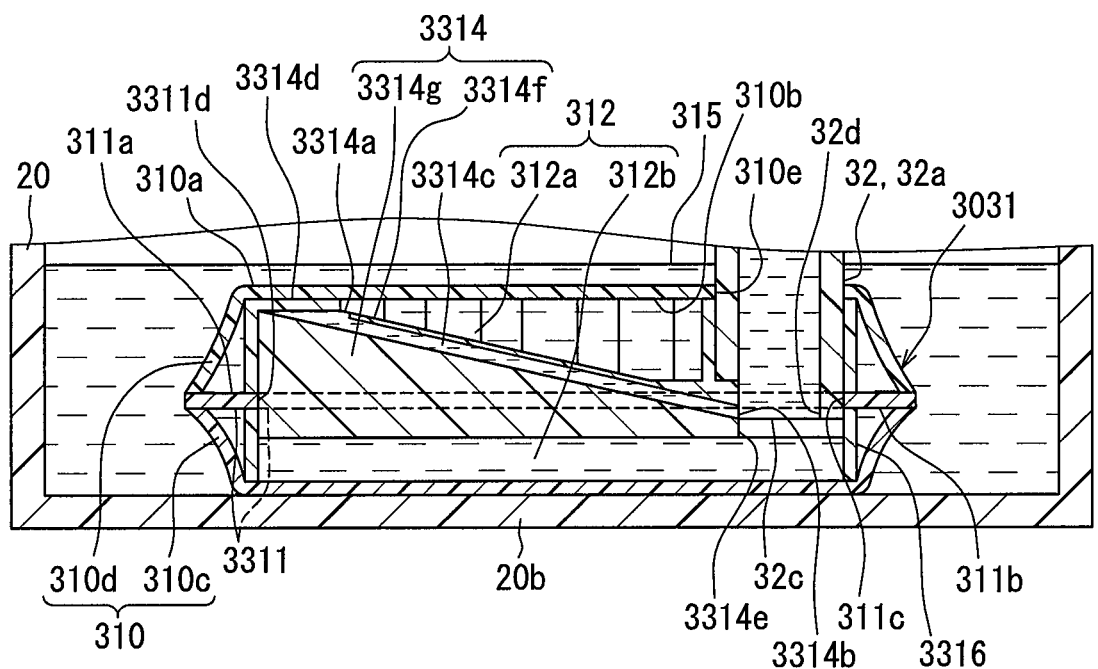
FIG. 18 is a cross-sectional view illustrating a variation of FIG. 8.

A ninth variation related to the third embodiment may form the first inflow port 3314a on the lower side in the first space 312a as illustrated in FIG. 16. A tenth variation related to the third embodiment may form the first outflow port 3314b that is separated from the opening portion 32c thereabove and is opened on the inner peripheral surface 1032f of the intake port 32a, as illustrated in FIG. 17. An eleventh variation related to the third embodiment need not be provided with the second passage element 313 as illustrated in FIG. 18.

A twelfth variation related to the first to third embodiments may dispose the inflow port 313a apart from the intake port 32a therebelow in the second space 312b. A thirteenth variation related to the first to third embodiments may secure the volume of the second space 312b to be larger than or equal to the volume of the first space 312a. A fourteenth variation related to the first to third embodiments may set the roughness of the mesh of dividing wall elements 311, 2311, and 3311 through which filtered fuel passes to be finer than the roughness of the mesh of the filter element 310 through which stored fuel passes.

Figure 19:
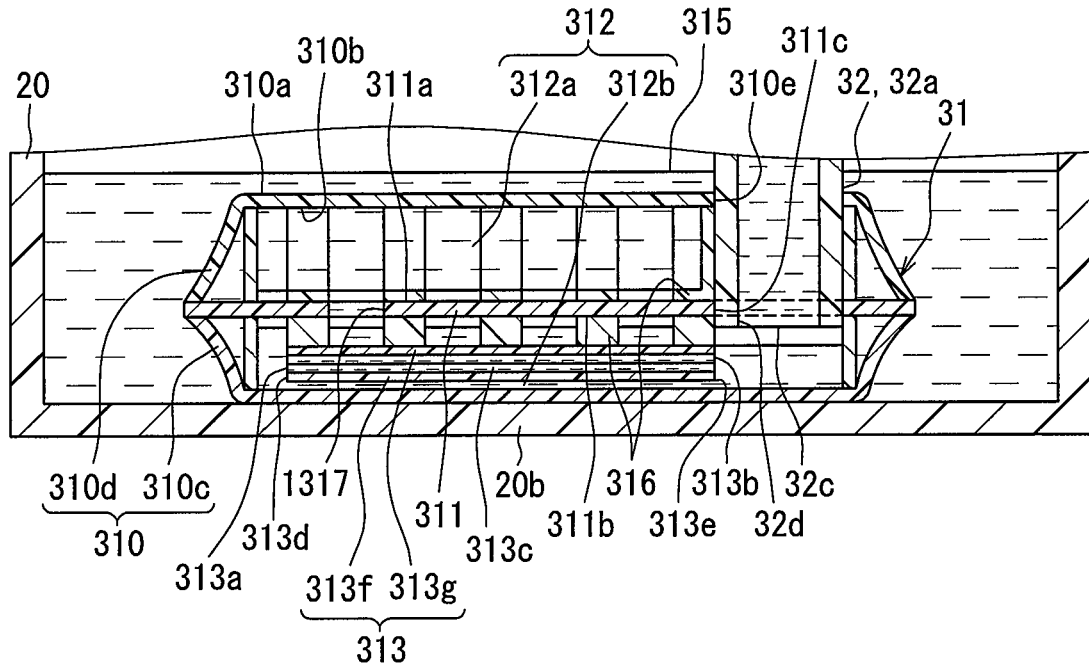
FIG. 19 is a cross-sectional view illustrating a variation of FIG. 2.

A fifteenth variation related to the first to third embodiments may partially divide the inner space 312 by providing a communicating window 1317 in a part of dividing wall elements 311, 2311, and 3311, as illustrated in FIG. 19. In the fifteenth variation of the first embodiment illustrated in FIG. 19, the communicating window 1317 is disposed in the dividing wall element 311 separated from the intake port 32*a* along the horizontal direction.

Figure 20:
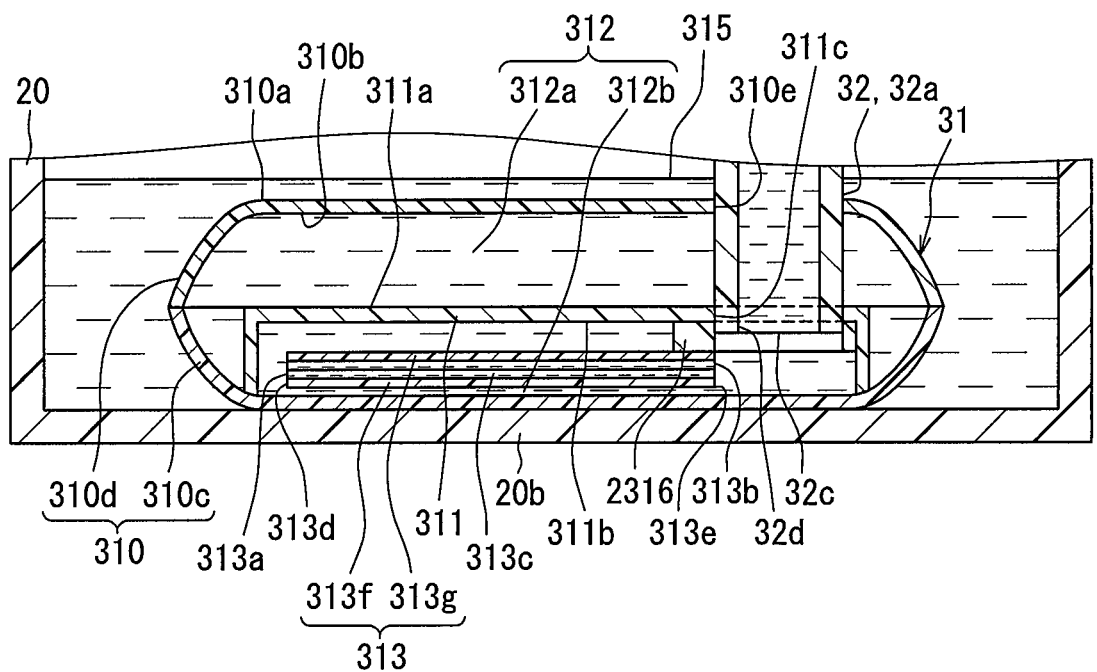
FIG. 20 is a cross-sectional view illustrating a variation of FIG. 2.

A sixteenth variation related to the first to third embodiments may form the first space 312*a* and the second space 312*b* by dividing the inner space 312 with dividing wall elements 311, 2311, and 3311 having the shape of a hollow, upside-down bottomed cylinder (that is, an upside-down cup shape), as illustrated in FIG. 20. In the sixteenth variation of the first embodiment illustrated in FIG. 20, the dividing wall element 311 having the shape of the upside-down bottomed cylinder is joined to the lower filter sheet 310*c* of the filter element 310. In the sixteenth variation of the first embodiment illustrated in FIG. 20, such a mode of joining allows the lower filter sheet 310*c* of the filter element 310 to enclose the second space 312*b* together with the dividing wall element 311. At the same time, in the sixteenth variation of the first embodiment illustrated in FIG. 20, the upper filter sheet 310*d* and the lower filter sheet 310*c* of the filter element 310 enclose the first space 312*a* together with the dividing wall element 311. In the sixteenth variation of the first embodiment illustrated in FIG. 20, the dividing wall element 311 is held by the holding element 2316 of the second embodiment.

A seventeenth variation related to the first to third embodiments may adopt a structure in which the fuel supply device 1 is not provided with the sub tank 20. An eighteenth variation related to the first to third embodiments may form the opening portion 32*c* of the intake port 32*a* of the fuel pump 32 to be opened not downward but in the horizontal direction or the like in the second space 312*b*.

Figure 21:
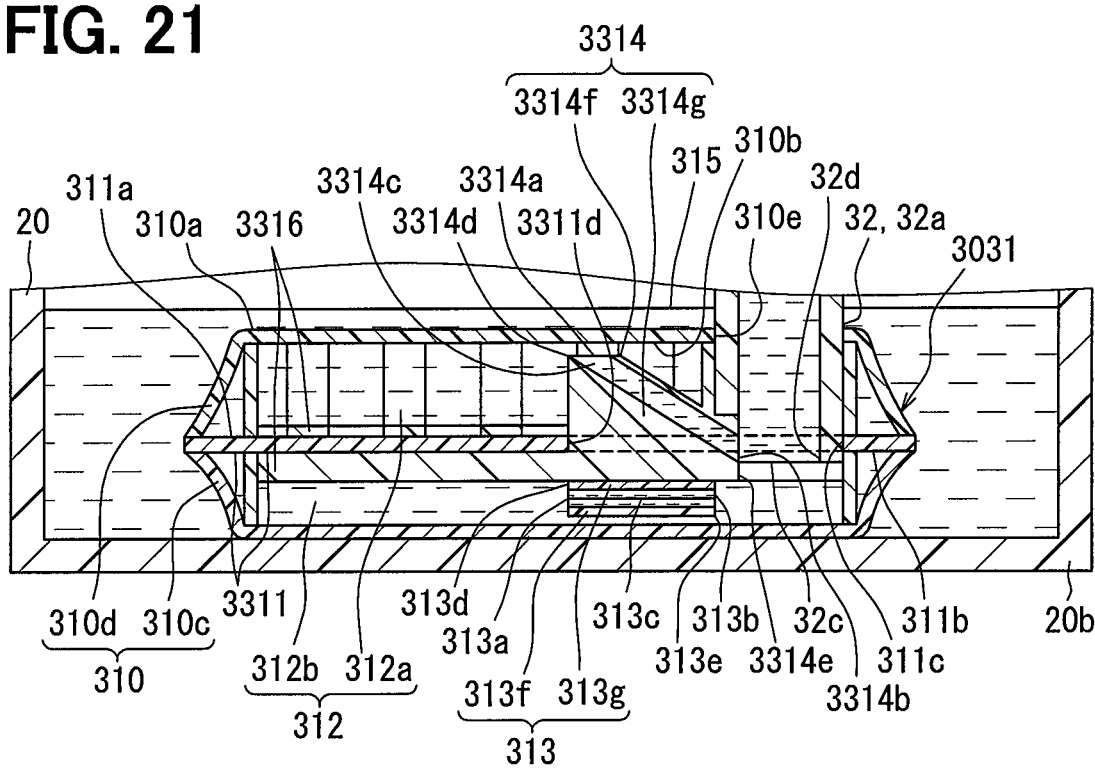
FIG. 21 is a cross-sectional view illustrating a variation of FIG. 8.

A nineteenth variation related to the first to third embodiments may dispose the inflow port 313*a* on the side of the intake port 32*a* along the horizontal direction in the second space 312*b*, as illustrated in FIG. 21. FIG. 21 illustrates the nineteenth variation of the third embodiment. A twentieth variation related to the third embodiment may dispose the first inflow port 3314*a* on the side of the intake port 32*a* along the horizontal direction in the first space 312*a*, as illustrated in FIG. 21. The twentieth variation illustrated in FIG. 21 in accordance with the first embodiment may dispose the second inflow port 313*a* in the second space 312*b* separated from the intake port 32*a* along the horizontal direction.

Figure 22:
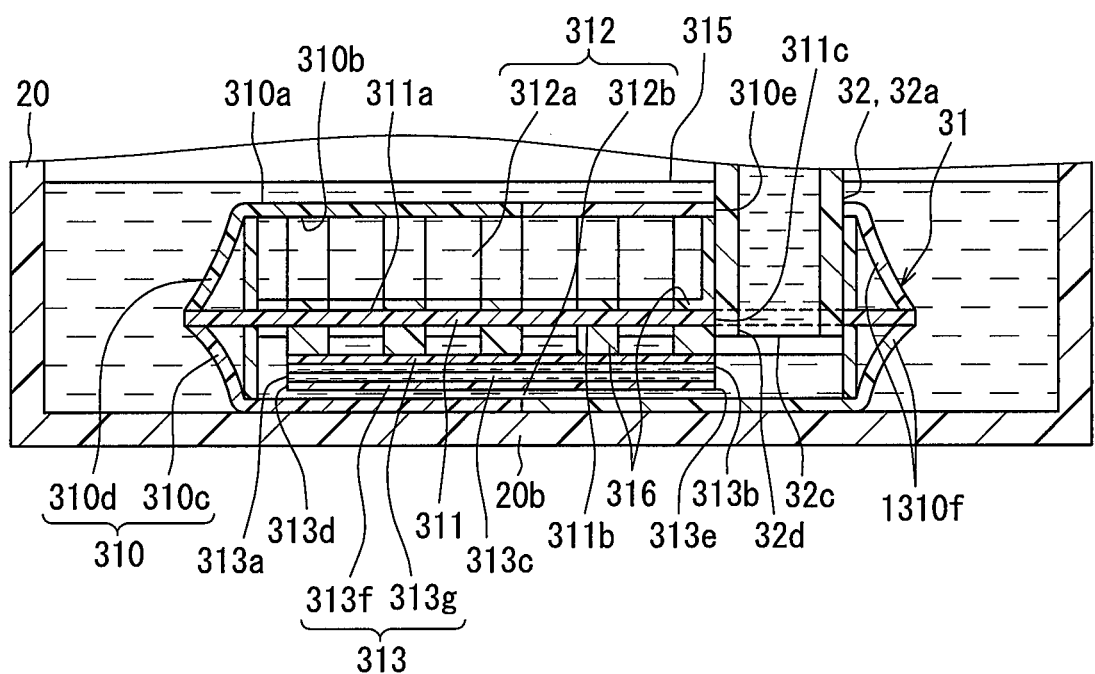
FIG. 22 is a cross-sectional view illustrating a variation of FIG. 2.
Figure 23:
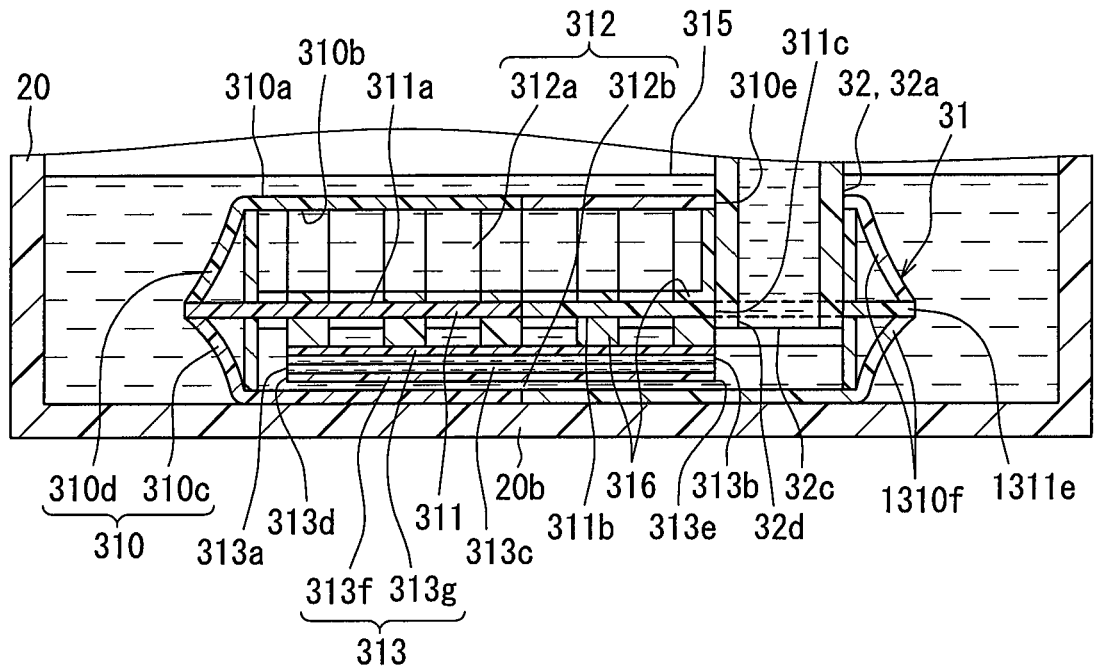
FIG. 23 is a cross-sectional view illustrating a variation of FIG. 2.

In a twenty-first variation related to the first to third embodiments, a part 1310*f* of the filter element 310 that is hollow as a whole may be made of material such as hard resin not fulfilling a filtration function in place of material fulfilling the filtration function, as illustrated in FIGS. 22 and 23. FIGS. 22 and 23 illustrate the twenty-first variation of the first embodiment in which the part 1310*f* of each of filter sheets 310*c* and 310*d* is made of material not fulfilling the filtration function.

Figure 24:
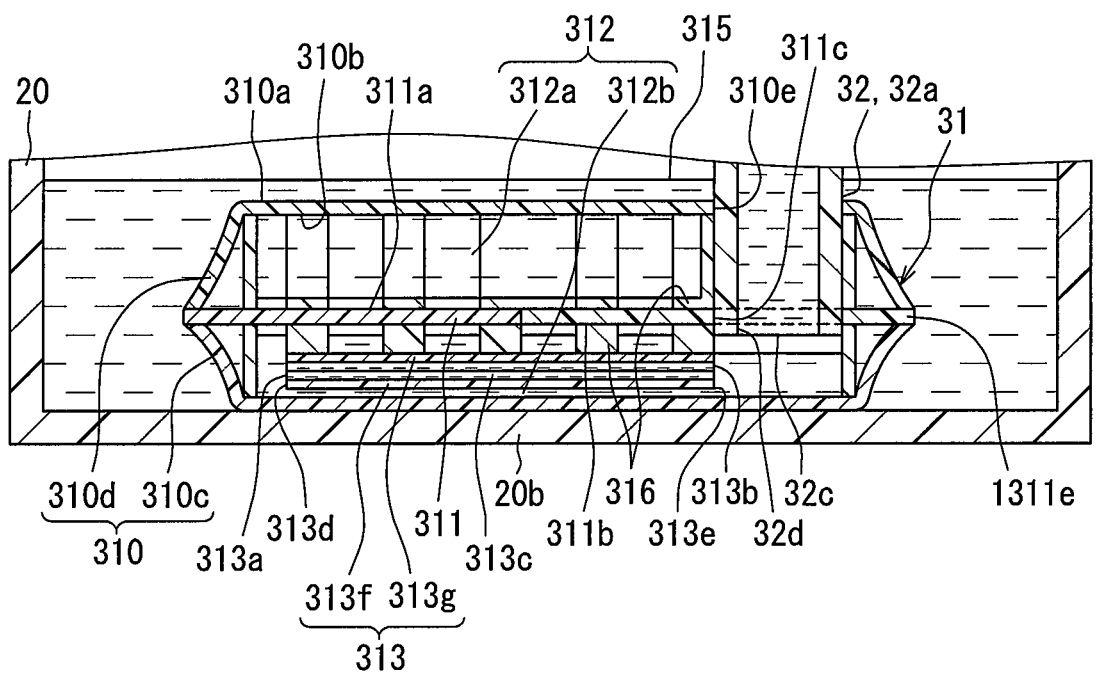
FIG. 24 is a cross-sectional view illustrating a variation of FIG. 2.

In a twenty-second variation related to the first to third embodiments, a part 1311*e* of dividing wall elements 311, 2311, and 3311 having the shape of a diaphragm as a whole may be made of material such as hard resin not fulfilling a filtration function in place of material fulfilling the filtration function, as illustrated in FIGS. 23 and 24. FIGS. 23 and 24 illustrate the twenty-second variation of the first embodiment.

The invention claimed is:

1. A suction filter that filters a fuel in a fuel tank of a vehicle and then allows the fuel to be drawn into an intake port of a fuel pump, the suction filter comprising:
    a filter element disposed in the fuel tank and formed of a filter sheet with a hollow shape to define an inner space therein, the filter element filtering a stored fuel that is the fuel stored in the fuel tank when the stored fuel passes through the filter sheet into the inner space;
    a dividing wall element disposed to divide the inner space into a first space, into which a filtered fuel that is the fuel filtered by the filter element flows, and a second space, to which the intake port drawing in the filtered fuel is opened, and enclosing the first space together with the filter element and enclosing the second space together with the filter element; and
    a first passage element including a first inflow port opened to the first space at a position in an upper half in the first space and a first outflow port to which an intake pressure is applied by the intake port, and defining a flow passage through which the filtered fuel flows from the first inflow port toward the first outflow port; and
    a second passage element including a second inflow port opened to the second space and a second outflow port to which the intake pressure is applied by the intake port, and defining a flow passage through which the filtered fuel flows from the second inflow port toward the second outflow port.

2. The suction filter according to claim 1, wherein the second outflow port is positioned around an opening portion of the intake port, the opening portion being opened to the second space.

3. The suction filter according to claim 1, wherein the second inflow port is positioned in the second space separated from the intake port in a horizontal direction.

4. The suction filter according to claim 1, wherein a volume of the second space is smaller than a volume of the first space.

5. The suction filter according to claim 1, wherein the dividing wall element that is a diaphragm shape is disposed to define the first space and the second space above and below the dividing wall element, respectively.

6. The suction filter according to claim 1, wherein a roughness of a mesh of the dividing wall element through which the filtered fuel passes is set to be larger than or equal to the roughness of the mesh of the filter element through which the stored fuel passes.

7. A fuel supply device that supplies a fuel from an interior of a fuel tank of a vehicle to an exterior of the fuel tank, the fuel supply device comprising:
    a fuel pump to discharge the fuel drawn into an intake port from the interior of the fuel tank to the exterior of the fuel tank; and
    the suction filter according to claim 1.

* * * * *

UNITED STATES PATENT AND TRADEMARK OFFICE
CERTIFICATE OF CORRECTION

| | |
|---|---|
| PATENT NO. | : 10,590,894 B2 |
| APPLICATION NO. | : 15/750573 |
| DATED | : March 17, 2020 |
| INVENTOR(S) | : Hayashi |

Page 1 of 1

It is certified that error appears in the above-identified patent and that said Letters Patent is hereby corrected as shown below:

On the Title Page

Item [30], delete:
"Dec. 20, 2015  (JP) ........................ 2015-240568"

Insert:
--Dec. 9, 2015  (JP) ........................ 2015-240568--

Signed and Sealed this
Twenty-third Day of June, 2020

Andrei Iancu
*Director of the United States Patent and Trademark Office*